United States Patent
Dutta (10) Patent No.: US 10,305,821 B2
(45) Date of Patent: May 28, 2019

(54) FACILITATING HOT-SWAPPABLE SWITCH FABRIC CARDS

(71) Applicant: AVAGO TECHNOLOGIES INTERNATIONAL SALES PTE. LIMITED, Singapore (SG)

(72) Inventor: Rajib Dutta, Cupertino, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 20 days.

(21) Appl. No.: 15/493,799

(22) Filed: Apr. 21, 2017

(65) Prior Publication Data

US 2017/0346766 A1   Nov. 30, 2017

Related U.S. Application Data

(60) Provisional application No. 62/340,957, filed on May 24, 2016.

(51) Int. Cl.
*H04L 12/931* (2013.01)
*H04L 12/933* (2013.01)

(52) U.S. Cl.
CPC ............ *H04L 49/40* (2013.01); *H04L 49/10* (2013.01)

(58) Field of Classification Search
CPC ....... H04L 49/40; H04L 49/10; H04L 49/405; H04L 49/00; H04L 49/30; H04L 49/357; H04L 49/602; H04L 49/351; H04L 49/35; H04L 49/45
See application file for complete search history.

(56) References Cited

U.S. PATENT DOCUMENTS

| | | |
|---|---|---|
| 2002/0099972 A1 | 7/2002 | Walsh et al. |
| 2006/0168377 A1 | 7/2006 | Vasudevan et al. |
| 2008/0147937 A1 | 6/2008 | Freimuth et al. |

FOREIGN PATENT DOCUMENTS

| | | | |
|---|---|---|---|
| CN | 103186373 A | | 6/2013 |
| CN | 103186373 A | * | 7/2013 |
| EP | 1730887 B1 | | 12/2006 |

* cited by examiner

*Primary Examiner* — Ian N Moore
*Assistant Examiner* — Brian T Le
(74) *Attorney, Agent, or Firm* — Xsensus/Broadcom (57) ABSTRACT

One embodiment of the present invention provides a switching system. The switching system includes a plurality of line cards, each of which includes one or more ports, a processor, one or more switch fabric cards for facilitating switching among the line cards, and a memory storing instructions for facilitating efficient hot-swapping. During operation, the switching system identifies a hot-swapping event of a first switch fabric card based on a data structure indicating the one or more switch fabric cards. The hot-swapping event indicates insertion or removal of the first switch fabric card while the switching system remains in an operational state. The switching system then determines an event type associated with the hot-swapping event and manages the first switch fabric card based on the determined event type.

18 Claims, 7 Drawing Sheets

FACILITATING HOT-SWAPPABLE SWITCH FABRIC CARDS

RELATED APPLICATION

This application claims the benefit of U.S. Provisional Application No. 62/340,957, titled "Method and System for Facilitating Hot-Swappable Switch Cards," by inventor Rajib Dutta, filed 24 May 2016, the disclosure of which is incorporated by reference herein.

BACKGROUND

Field

The present disclosure relates to communication networks. More specifically, the present disclosure relates to a system and a method for efficiently facilitating hot-swappable switch fabric cards in a switch.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as efficient management of switch cards. However, the capabilities of a switch cannot grow infinitely. It is limited by physical space, power consumption, and design complexity, to name a few factors. Furthermore, switches with higher capability are usually more complex and expensive. As a result, increasing efficiency in existing capabilities of a switch adds significant value proposition.

To meet with increasing traffic demand, an operational switch can support hot-swappable switch cards, such as line cards and switch fabric cards (SFCs). A hot-swappable card can be added or removed while the switch remains active. A line card can include one or more ports (or interfaces) that allow links to connect to the switch. A switch fabric card facilitates a switch fabric of the switch, which allows internal switching within the switch (i.e., switching of packets within the switch, such as between line cards). Adding a new switch fabric card can expand the internal switching capability of the switch through its switch fabric. On the other hand, if a switch fabric card fails, that switch fabric card can be taken out of the switch. In either case, the switch configures its overall switch fabric to determine how the internal switching of the switch should operate.

While the use of hot-swappable cards brings many desirable features in an active switch, some issues remain unsolved in facilitating efficient hot-swappable switch fabric cards.

SUMMARY

One embodiment of the present invention provides a switching system. The switching system includes a plurality of line cards, each of which includes one or more ports, a processor, one or more switch fabric cards for facilitating switching among the line cards, and a memory storing instructions for facilitating efficient hot-swapping. During operation, the switching system identifies a hot-swapping event of a first switch fabric card based on a data structure indicating the one or more switch fabric cards. The hot-swapping event indicates insertion or removal of the first switch fabric card while the switching system remains in an operational state. The switching system then determines an event type associated with the hot-swapping event and manages the first switch fabric card based on the determined event type.

In a variation on this embodiment, if the event type indicates a presence of the first switch fabric card, the switching system determines that the first switch fabric card is ready for programming by identifying the hot-swapping event from the data structure. The switching system then manages the first switch fabric card by programming the first switch fabric card to participate in the internal switching within the switching system.

In a variation on this embodiment, the switching system refrains from identifying the hot-swapping event based on an interrupt signal associated with the first switch fabric card.

In a variation on this embodiment, the first switch fabric card is a Peripheral Component Interconnect Express (PCIe) card pluggable to a PCIe interface of a PCIe control switch within the switching system.

In a further variation, the switching system updates the data structure based on identifying a respective device coupling a PCIe interface of the PCIe control switch.

In a variation on this embodiment, the data structure is provided by an operating system of the switching system.

In a variation on this embodiment, if the event type indicates that the first switch fabric card is inaccessible, the switching system manages the first switch fabric card by disabling the first switch fabric card and determining whether the first switch fabric card becomes accessible within a predetermined number of attempts. Disabling the first switch fabric card ensures that the first switch fabric card does not participate in the internal switching of the switching system.

In a further variation, if the first switch fabric card remains inaccessible within the predetermined number of attempts, the switching system removes programming information associated with the first switch fabric card from the switching system.

In a further variation, if the first switch fabric card becomes accessible within the predetermined number of attempts, the switching system enables the first switch fabric card, thereby allowing the first switch fabric card to participate in the switching among the line cards.

In a variation on this embodiment, the switching system rearranges the switching among the line cards based on the hot-swapping event of the first switch fabric card.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently managing hot-swappable switch fabric cards in a switch is solved by using only the card interface to provision a newly joined fabric card, without using an interrupt to the control processor of the switch. A hot-swappable switch fabric card can be inserted into or removed from a switch while the switch remains operational (e.g., is receiving, switching, and transmitting traffic). The insertion process of a hot-swappable switch fabric card can be referred to as hot plugging-in; and the removal process of a hot-swappable switch fabric card can be referred to as hot unplugging.

With existing technologies, when a hot-swapping event for a switch fabric card, which can also be referred to as a fabric card, occurs in a switch, an interrupt is sent to the control processor of the switch. Typically, upon detecting the event (e.g., presence or absence of the switch fabric card), a register of the switch records an interrupt. The control processor receives this interrupt from the register (e.g., using an internal communication channel) and instructs a program module to initialize the event-handling process associated with the event. For example, if the switch fabric card is a Peripheral Component Interconnect Express (PCIe) card and coupled to a PCIe switch, the control processor receives the interrupt from a communication channel that is separate from the PCIe interface. Upon receiving the interrupt, the control processor can instruct the program module to initialize the event-handling process of a PCIe device via the PCIe switch, which facilitates the PCIe interfaces in the switch.

This program module can run on the management space (e.g., the user space used for managing the switch) and is capable of programming a respective switch fabric card. However, when the program module initializes the event-handling process, the switch fabric card may not be ready for the process. As a result, the control processor performs additional operations, such as a delayed response, to ensure the readiness of the switch fabric card. Furthermore, such interrupt-based event-handling for a switch fabric card requires a separate interrupt channel to the control processor. In addition, the additional processing can occupy processor cycles at the control processor, which can hinder the overall performance of the switch.

To solve this problem, embodiments of the present invention facilitate event-handling associated with hot-swappable fabric switch cards by using the control interface (e.g., PCIe interface) without using an interrupt transmitted via the communication channel different from the control interface. During operation, if a new switch fabric card is inserted into the switch and becomes available for configuration, the switch fabric card becomes available to the operating system, such as a LINUX operating system, of the switch. In some embodiments, a hot-swapping event causes the operating system to enumerate the switch fabric cards to determine the presence of a new card.

This enumeration process provides a device view to the operating system, which lists (e.g., in a device table) the operational devices or modules available to the switch. In some embodiments, the switch maintains a device driver with a callback support to this device view. This allows the device driver to obtain the information from the device view and provide the information to the program module. Since the presence or absence of a switch fabric card is reported to the program module upon becoming available for configuration, the program module can initiate the programming of the switch fabric card without requiring additional operations performed by the control processor. In this way, the event-handling process associated with a switch fabric card becomes self-contained.

In some embodiments, the switch can be a member switch of a network of interconnected switches (e.g., a fabric switch). In a fabric switch, any number of switches coupled in an arbitrary topology can be controlled as a single logical switch. The fabric switch can be an Ethernet fabric switch or a virtual cluster switch (VCS), which can operate as a single Ethernet switch. In some embodiments, a respective switch in the fabric switch is an Internet Protocol (IP) routing-capable switch (e.g., an IP router). In some further embodiments, a respective switch in the fabric switch is a Transparent Interconnection of Lots of Links (TRILL) routing bridge (RBridge).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change over time.

It should also be noted that a fabric switch is distinct from a virtual local area network (VLAN). A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identify the switch as a member switch of the fabric switch.

In this disclosure, the term "fabric switch" refers to a number of interconnected physical switches, which can form a single, scalable network of switches. The member switches of the fabric switch can operate as individual switches. The member switches of the fabric switch can also operate as a single logical switch in the provision and control plane, the data plane, or both. "Fabric switch" should not be interpreted as limiting embodiments of the present invention to a plurality of switches operating as a single, logical switch. In this disclosure, the terms "fabric switch" and "fabric" are used interchangeably.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch.

Switch Architecture

Figure 1A:
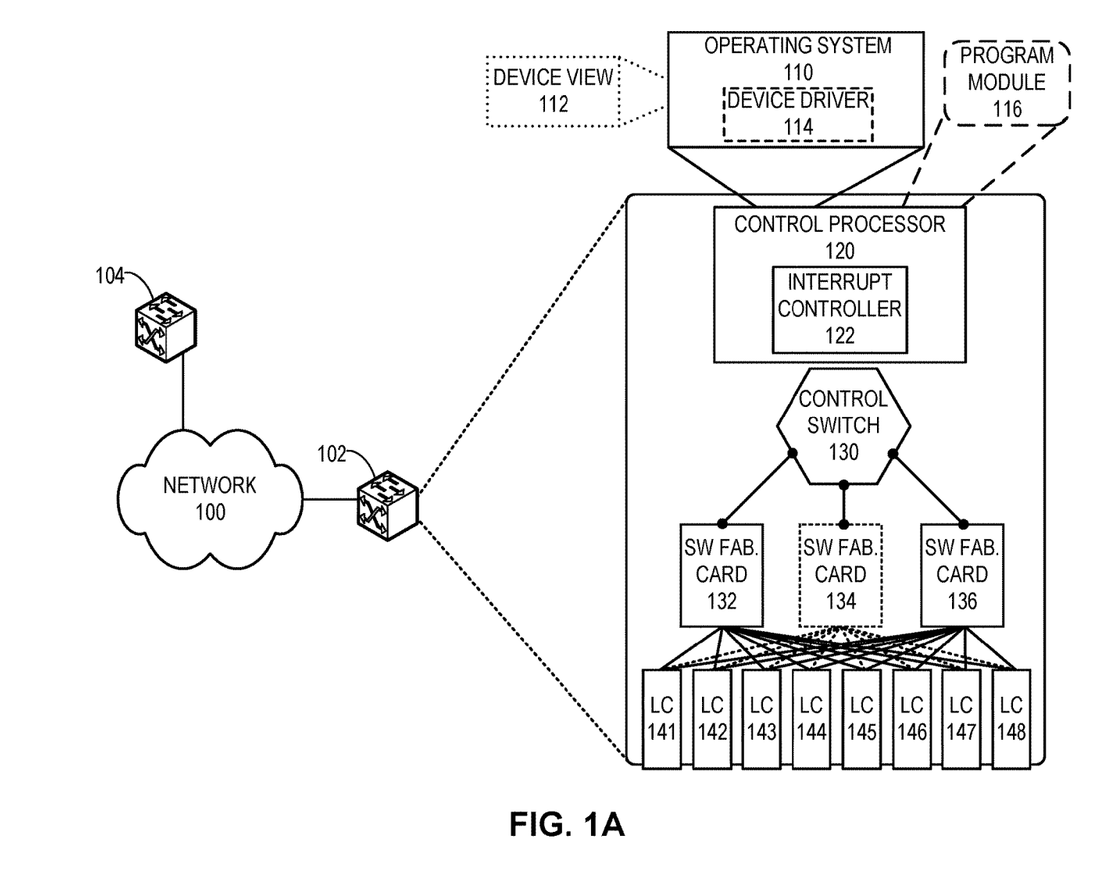
FIG. 1A illustrates an exemplary insertion of a switch fabric card into a switch supporting efficient hot-swapping, in accordance with an embodiment of the present invention.

FIG. 1A illustrates an exemplary insertion of a switch fabric card to a switch supporting efficient hot-swapping, in accordance with an embodiment of the present invention. In this example, switches 102 and 104 are coupled to a network 100. Network 100 can be a local area network (LAN), a wide area network (WAN), or a data center network (DCN). If network 100 is a DCN, switch 102 and/or switch 104 can be top of the rack switches. Switch 102 can include a plurality of hot-swappable cards. A hot-swappable card can be added to or removed from switch 102 while switch 102 remains operational. The plurality of hot-swappable cards of switch 102 can include one or more line cards and switch fabric cards.

Here, switch 102 includes a plurality of line cards 141, 142, 143, 144, 145, 146, 147, and 148. A respective line card can include one or more ports (or interfaces) that allow links to connect to switch 102. Switch 102 can also include switch fabric cards 132 and 136. Switch fabric cards 132 and 136 can be coupled to a control switch 130 via respective control interfaces. It should be noted that this control switch 130 can be a switching chip within switch 102. The control interfaces of control switch 130 are distinct from the ports (or interfaces) of the line card. The control interfaces of control switch 130 may only receive traffic from the line cards of switch 102 and may not receive traffic directly from an external networking device (e.g., from another switch).

For example, if switch fabric cards 132 and 136 are PCIe cards, control switch 130 can be a PCIe switch. Switch fabric cards 132 and 136 are then coupled to control switch 130 via respective PCIe interfaces. Switch fabric cards 132 and 136 facilitate the switching fabric of switch 102 via control switch 130. The switching fabric allows internal switching of switch 102 (i.e., switching of packets within switch 102, such as between line cards 141 and 144). In some embodiments, a respective switch fabric card is coupled to a respective line card. As a result, a packet from a line card can be switched to any other line card by any of the switch fabric cards.

Suppose that a new switch fabric card 134 (denoted with dotted lines) is a hot plugged-in switch 102. With existing technologies, an interrupt is sent to a control processor 120 of switch 102 indicating the presence of switch fabric card 134. Typically, upon detecting the presence of switch fabric card 134, a register of switch 102 records an interrupt. An interrupt controller 122 of control processor 120 receives this interrupt from the register using an internal communication channel and instructs a program module 116 to initialize switch fabric card 134. One or more pins of control processor 120 can be coupled to the register via a communication channel that is separate from the PCIe interface of control switch 130, thereby allowing control processor 120 to receive the interrupt. Interrupt controller 122 then instructs program module 116 to initialize switch fabric card 134, which includes programming of switch fabric card 134, via control switch 130.

Program module 116 can run on the user space used for managing the switch and is capable of programming a respective switch fabric card. However, when program module 116 receive instruction to initialize switch fabric card 134, the card may not be ready for initialization. As a result, control processor 120 can perform additional operations, such as a delayed response, to ensure the readiness of switch fabric card 134. Furthermore, such interrupt-based event-handling causes control processor 120 to act upon the interrupt signal associated with the hot-swapping event. Such operations can take up processor cycles at control processor 120, which can hinder the overall performance of switch 102.

To solve this problem, switch 102 facilitates event-handling associated with hot-swapping event of switch fabric card 134 by using the control interface (e.g., PCIe interface) of control switch 130. In this way, switch 102 can detect the hot plugging-in of switch fabric card 134 without using the interrupt. When switch fabric card 134 is inserted into switch 102 and becomes available for configuration, switch fabric card 134 becomes available to operating system 110

(e.g., a LINUX operating system) of switch 102. In some embodiments, a hot-swapping event causes operating system 110 to enumerate the switch fabric cards in switch 102 to determine the presence (or absence) of a switch fabric card 134.

This enumeration process provides a device view 112 to operating system 110. This device view 112 can list the operational devices or modules available to switch 102 in a device table. In some embodiments, switch 102 maintains a device driver 114, which can be installed on operating system 110, with a callback support to device view 112. This allows device driver 114 to obtain information associated with the switch fabric cards from device view 112 and provide the information to program module 116. Since information in device view 112 indicates that switch fabric card 134 is available for configuration, upon getting the information about the presence of switch fabric card 134 from device driver 114, program module 116 initiates the programming of switch fabric card 134. In this way, the hot plugging-in of switch fabric card 134 becomes self-containing in switch 102. It should be noted that switch fabric cards 132 and 136 as well as line cards 141-148 can be distributed across multiple devices. A Linux operating system based distributed system can discover these cards and program them. For example, these multiple devices can be in a software-defined network (SDN) and a controller of the SDN can send flow definitions to the devices to manage these cards.

Figure 1B:
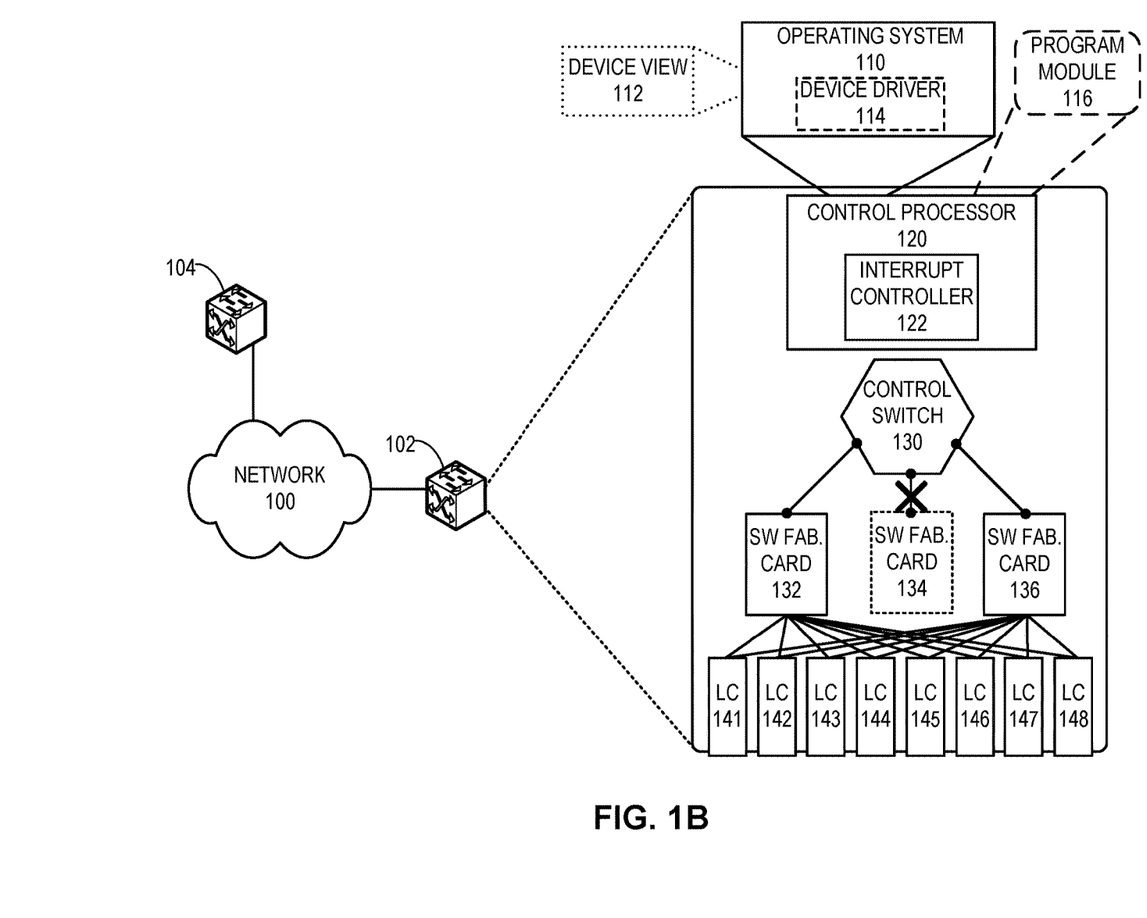
FIG. 1B illustrates an exemplary unavailability of a switch fabric card from a switch supporting efficient hot-swapping, in accordance with an embodiment of the present invention.

FIG. 1B illustrates an exemplary unavailability of a switch fabric card from a switch supporting efficient hot-swapping, in accordance with an embodiment of the present invention. Suppose that switch fabric card 134 becomes unavailable (denoted with a cross) while switch 102 remains active. The unavailability can be due to a failure or a removal of switch fabric card 134. The unavailability of switch fabric card 134 can be referred to as a hot unplugging of switch fabric card 134. In some embodiments, switch 102 determines switch fabric card 134 to be unavailable if switch fabric card 134 remains inaccessible within a predefined number of attempts.

Here, switch 102 can detect the hot unplugging of switch fabric card 134 without using an interrupt transmitted via the communication channel different from the interfaces of control switch 130. The hot-swapping feature of switch 102 then allows switch 102 to rearrange its internal switching using switch fabric cards 132 and 136. In some embodiments, the rearrangement includes reprogramming of switch fabric cards 132 and 136.

When switch fabric card 134 becomes unavailable to switch 102, operating system 110 enumerates the switch fabric cards in switch 102 and determines the absence of previously initialized switch fabric card 134. This enumeration process provides the current device view 112, which lists switch fabric cards 132 and 136. Device driver 114 obtains information associated with the switch fabric cards from device view 112 and provides the information to program module 116. Since information in device view 112 indicates that switch fabric card 134 is unavailable, upon getting the information about the absence of switch fabric card 134 from device driver 114, program module 116 disables switch fabric card 134, and initiates the reprogramming of the available switch fabric cards 132 and 136. In this way, switch 102 reconfigures its switching fabric and the hot unplugging of switch fabric card 134 becomes self-containing.

In some embodiments, the hot plugging/unplugging of the switch fabric cards is supported using a software development kit (SDK). The SDK includes device driver 114, which finds the supportable switch fabric cards. Device driver 114 can operate as a respective kernel module associated with a corresponding switch fabric card. A respective kernel module supports callback from program module 116 and receives callback for all supported switch fabric cards. Upon starting, program module 116 reads from a respective kernel module associated with a corresponding switch fabric card and calls a resource file that includes parse-able actions for the corresponding device type (e.g., type indicating a switch fabric card). The actions include init soc, init bcm, init interrupt, etc.

On the other hand, removal of a switch fabric card (i.e., un-initialization) can depend on the availability of control processor 120. If switch fabric card 134 becomes unavailable (e.g., due to removal or a failure), packets sent to switch fabric card 134 may be lost. Hence, access to switch fabric card 134 can be disabled to prevent further errors in packet processing. When control processor 120 becomes available, program module 116 can initiate reconfiguring of the internal switching fabric of switch 102.

Hot-Swapping Switch Fabric Cards

Figure 2:
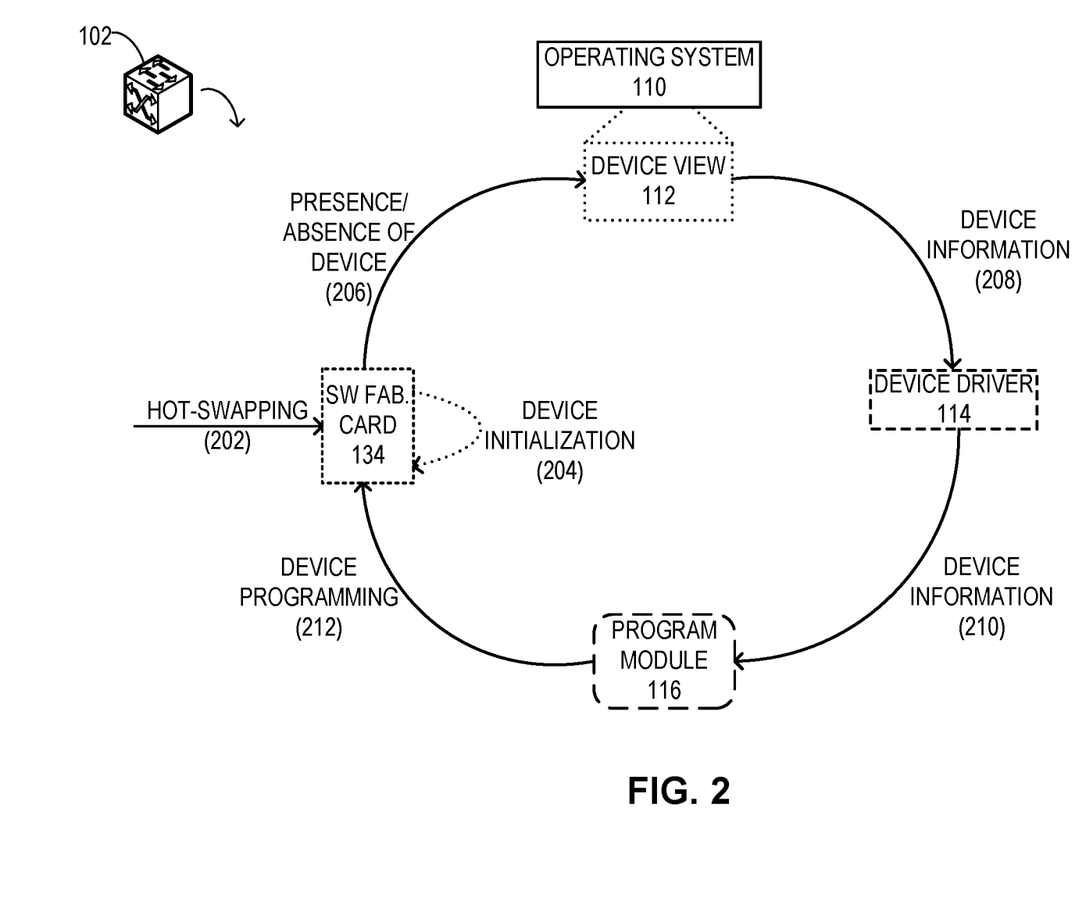
FIG. 2 illustrates an exemplary flow diagram of the efficient hot-swapping of a switch fabric card in a switch, in accordance with an embodiment of the present invention.

FIG. 2 illustrates an exemplary flow diagram of the efficient hot-swapping of a switch fabric card in a switch, in accordance with an embodiment of the present invention. During operation, a hot-swapping event associated with switch fabric card 134 is detected at switch 102 (operation 202). This event can be an addition or a removal of switch fabric card 134. If switch fabric card 134 is hot plugged-in, switch fabric card 134 can initialize itself (e.g., can power up) (operation 204). This operation is applicable to hot plug-in (denoted with dotted line). The presence or absence of switch fabric card 134 then appears in device view 112 (operation 206). In some embodiments, operating system 110 enumerates a respective switch fabric card of switch 102 to determine the presence or absence of switch fabric card 134. In this way, only upon becoming available for configuration, switch fabric card 134 appears in device view 112.

Device driver 114 obtains the device information associated with switch fabric card 134 from device view 112 (operation 208). The device information for a switch fabric card includes information needed for configuring the switch fabric card. Device driver 114 provides this information to program module 116 (operation 210) (e.g., using a callback). Program module 116 then programs switch fabric card 134 based on the information (operation 212). For a hot plug-in, such programming can include configuring switch fabric card 134. On the other hand, for a hot unplugging, the programming can be disabling switch fabric card 134. Based on the currently available switch fabric cards, program module 116 can reprogram the internal switching fabric for switch 102.

Figure 3:
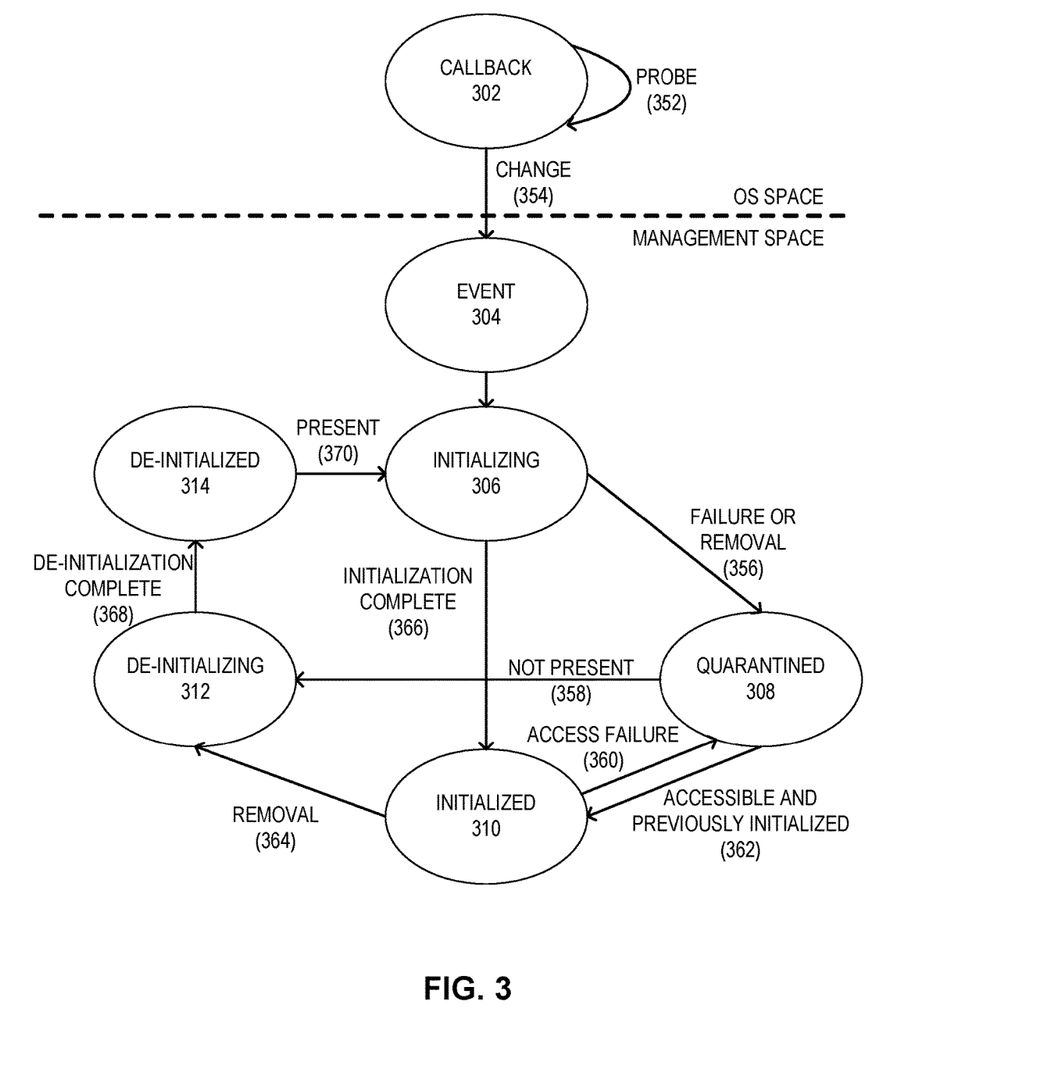
FIG. 3 illustrates an exemplary state diagram of the management process of the efficient hot-swapping of a switch fabric card in a switch, in accordance with an embodiment of the present invention.

FIG. 3 illustrates an exemplary state diagram of the management process of the efficient hot-swapping of a switch fabric card in a switch, in accordance with an embodiment of the present invention. Initially, the process is in a callback state (state 302). At this state, the program module probes the device driver for a change (e.g., the presence of a new switch fabric card) (operation 352). This probing can take place in the operating system space. If the program module detects a change (operation 354), the process transitions to an event state (state 304). This state indicates that the program module has detected an event. The process then transitions to the management space (e.g., in the user space).

Upon detecting the event, the process transitions to an initializing state (state 306), which indicates an initialization of the event. If the event is a hot plug-in, the program module completes the initialization (e.g., the program module completes the configuration of the switch fabric card) (operation 366). The process then transitions to an initialized state (state 310), indicating that the switch fabric card has been initialized. On the other hand, if the event is a hot unplugging, such as a failure or a removal (operation 356), the process transitions to a quarantined state (state 308). In this state, the switch fabric card remains in a disabled state, thereby preventing any switching within a switch using the switch fabric card. Similarly, if an initialized switch fabric card encounters an access failure (operation 360), the process transitions to a quarantined state (state 308).

If the switch fabric card becomes accessible (e.g., recovers from the failure) and has been previously initialized, the process transitions to the initialized state (state 310). Under such circumstances, the program module may not need to reprogram the switch fabric card. It should be noted that the switch fabric card can be deemed accessible if the switch fabric card responds within a predefined number of attempts. Otherwise, the switch fabric card can be deemed as not present (operation 358) and the process transitions to a de-initializing state (state 312). This state indicates the removal process of the switch fabric card. The de-initializing process can include one or more of: removal of programming information associated with the switch fabric card and reprogramming the available switch fabric cards.

Similarly, if an initialized switch fabric card is removed from the switch (operation 364), the process transitions to a de-initializing state (state 312). The program module then completes the de-initialization (e.g., reprogramming the available switch fabric cards) (operation 368). The process then transitions to a de-initialized state (state 314), indicating that the switch fabric card has been de-initialized. However, if the device driver determines the presence of the switch fabric card (operation 370), the process transitions to the initializing state (state 306) again.

Operations

Figure 4A:
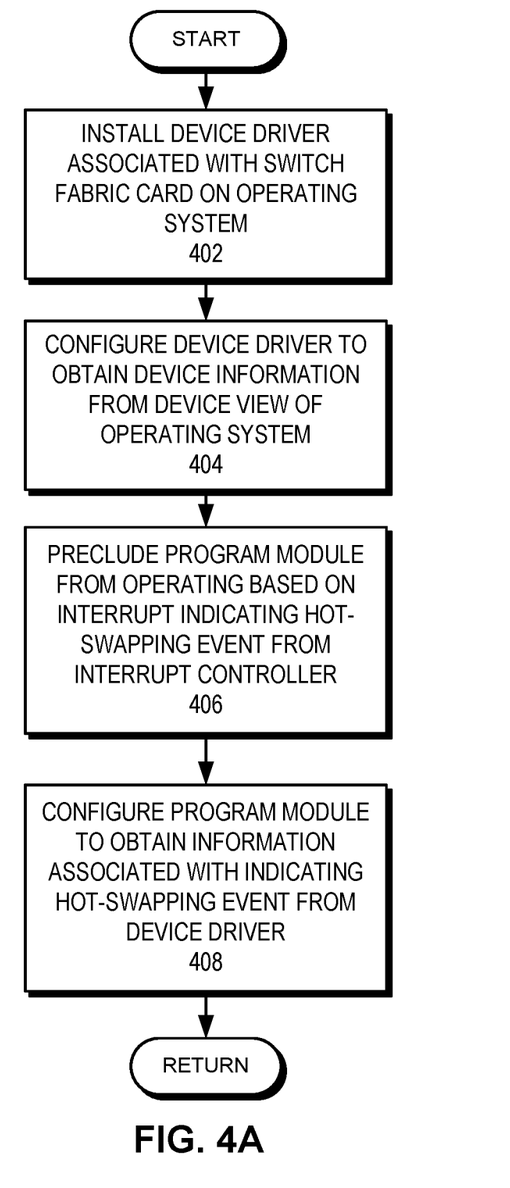
FIG. 4A presents a flowchart illustrating an exemplary process of a switch initializing the efficient hot-swapping of a switch fabric card, in accordance with an embodiment of the present invention.

FIG. 4A presents a flowchart illustrating an exemplary process of a switch initializing the efficient hot-swapping of a switch fabric card, in accordance with an embodiment of the present invention. During operation, the switch installs a device driver associated with a switch fabric card on the operating system (operation 402). The switch configures the device driver to obtain device information from the device view of the operating system (operation 404). The switch can also preclude the program module, which is responsible for programming the switch fabric card, from operating based on an interrupt indicating a hot-swapping event from an interrupt controller (operation 406). The switch configures the program module to obtain information associated with the hot-swapping event from the device driver (operation 408).

Figure 4B:
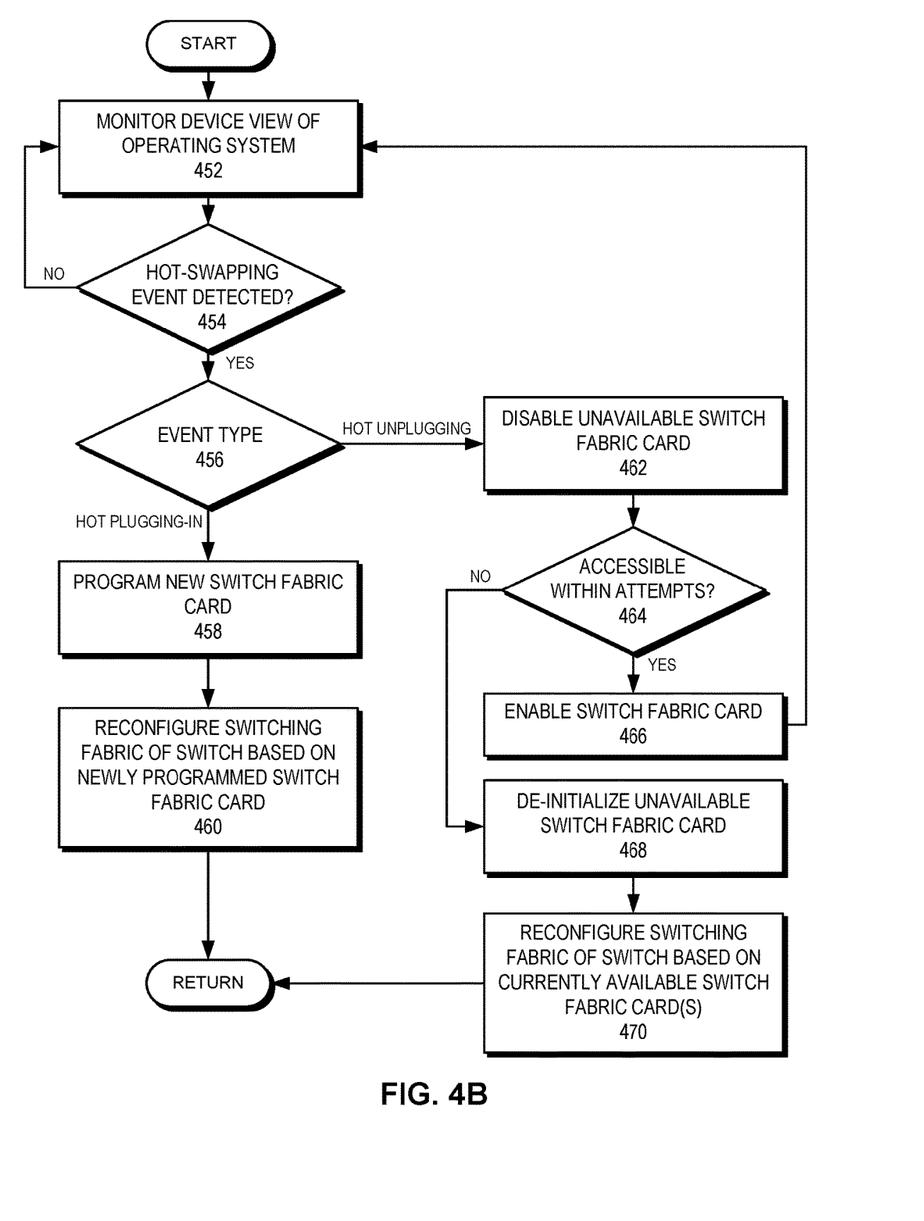
FIG. 4B presents a flowchart illustrating an exemplary process of a program module efficiently hot-swapping a switch fabric card, in accordance with an embodiment of the present invention.

FIG. 4B presents a flowchart illustrating an exemplary process of a program module efficiently hot-swapping a switch fabric card, in accordance with an embodiment of the present invention. During operation, the program module monitors the device view of the operating system (operation 452) and checks whether a hot-swapping event has been detected (operation 454). If the program module has not detected an event, the program module continues to monitor the device view (operation 452). On the other hand, if the program module detects an event, the program module checks for the type of event (operation 456).

If the event is a hot plugging-in event, the program module programs the new switch fabric card (operation 458) and reconfigures the switching fabric of the switch based on the newly programmed switch fabric card (operation 460). The reconfigured switching fabric of the switch uses the new switch fabric card for switching traffic within the switch (e.g., among the line cards). On the other hand, if the event is a hot unplugging event, the program module disables the unavailable switch fabric card (operation 462). Disabling the switch fabric card allows the program module to avoid using the unavailable switch fabric card for switching traffic within the switch. The line cards then only forward traffic to the available switch fabric cards.

It should be noted that the switch fabric card can become temporarily inaccessible to the switch, as described in conjunction with FIG. 3. The switch then temporarily avoids using the switch fabric card (e.g., by disabling the switch fabric card). However, the program module may not remove the programming of the switch fabric card or rearrange its switching fabric. The program module checks whether the switch fabric card becomes accessible within a predefined number of attempts (e.g., within k number of attempts) (operation 464). If the switch fabric card becomes accessible, the program module enables the switch fabric card (operation 466) and continues to monitor the device view (operation 452). On the other hand, if the switch fabric card remains inaccessible, the program module de-initializes the switch fabric card (operation 468) and reconfigures the switching fabric of the switch based on the currently available switch fabric card(s) (operation 470).

Exemplary Switch

Figure 5:
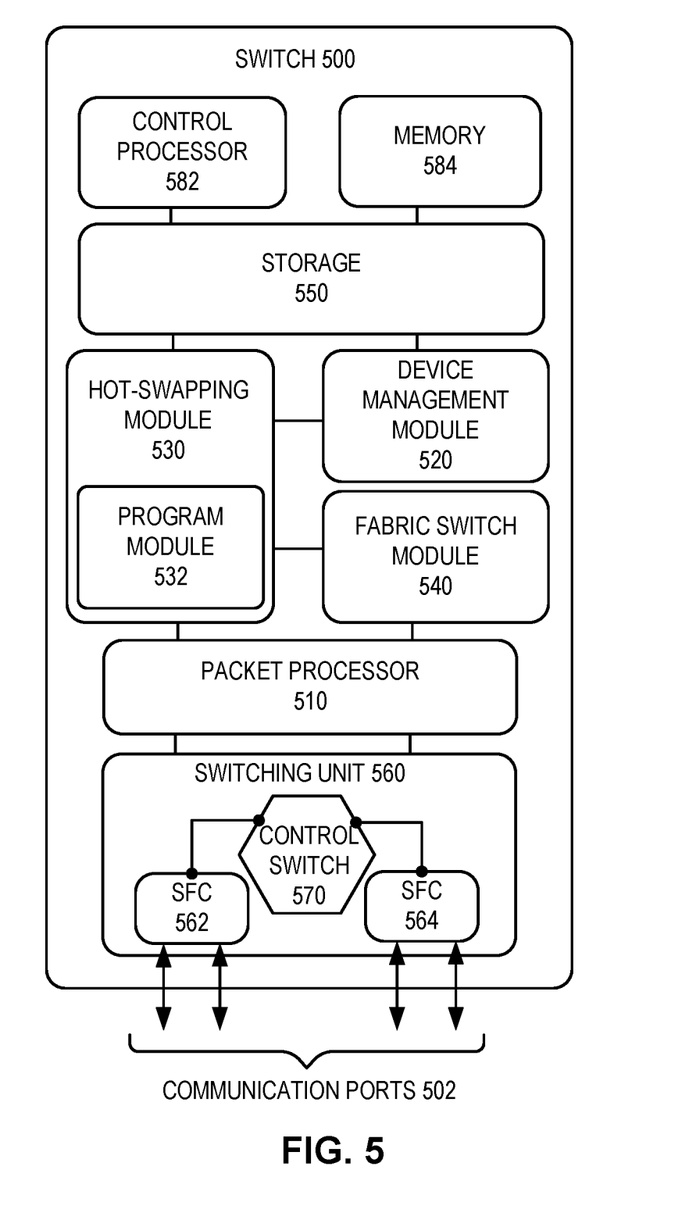
FIG. 5 illustrates an exemplary switch facilitating the efficient hot-swapping of a switch fabric card, in accordance with an embodiment of the present invention.

FIG. 5 illustrates an exemplary switch facilitating the efficient hot-swapping of a switch fabric card, in accordance with an embodiment of the present invention. In this example, a switch 500 includes a number of communication ports 502, a packet processor 510, a hot-swapping module 530, a program module 532, a device management module 520, and a storage device 550. Switch 500 can also include switch modules, such as processing hardware of switch 500 (e.g., ASIC chips). Switch 500 can also include switching unit 560, which facilitates the switching fabric of switch 500.

In this example, switching unit 560 includes two hot-swappable switch fabric cards 562 and 564 coupled to respective control interfaces of a control switch 570. Here, switch fabric cards 562 and 564 are hot-swappable switch cards pluggable to switch 500. In some embodiments, control switch 570 is a PCIe switch and the control interfaces are PCIe interfaces. Switching unit 560 can also include a plurality of line cards (not shown in FIG. 5), each of which includes a subset of communication ports 502. In some embodiments, each of switch fabric cards 562 and 564 is coupled to a respective line card in switching unit 560. As a result, a packet from a line card can be switched to any other line card by any of the switch fabric cards. Here, device management module 520 can include the device driver for switch fabric cards 562 and 564.

Packet processor 510 extracts and processes header information from the received packets. Packet processor 510 can identify a switch identifier associated with the switch in the header of a packet. Switch 500 can also include a control processor 582 and a memory 584. Packet processor 510 can also construct a control message for a controller comprising information from the tunnel information table. Packet processor 510 can receive one or more flow definitions from a controller of a software-defined network (SDN) and apply them to corresponding ports. If the flow definition includes a generic flow rule, control processor 582 can convert the generic flow rule to a port-specific flow rule for a respective SDN-enabled port in communication ports 502.

In some embodiments, switch 500 maintains a membership in a fabric switch, as described in conjunction with FIG. 1, wherein switch 500 also includes a fabric switch module 540. Fabric switch module 540 maintains a configuration database in storage device 550 that maintains the configuration state of every switch within the fabric switch. Fabric switch module 540 maintains the state of the fabric switch, which is used to join other switches. In some embodiments, switch 500 can be configured to operate in conjunction with a remote switch as an Ethernet switch.

Communication ports 502 can include inter-switch communication channels for communication within the fabric switch. This inter-switch communication channel can be implemented via a regular communication port and based on any open or proprietary format. Communication ports 502 can also include one or more extension communication ports for communication between neighbor fabric switches. Communication ports 502 can include one or more TRILL ports capable of receiving frames encapsulated in a TRILL header. Communication ports 502 can also include one or more IP ports capable of receiving IP packets. An IP port is capable of receiving an IP packet and can be configured with an IP address. Packet processor 510 can process TRILL-encapsulated frames and/or IP packets (e.g., tunnel-encapsulated packets).

During operation, device management module 520 identifies a hot-swapping event of a switch fabric card (e.g., switch fabric card 562 or 564) from a device view of the operating system of switch 500. Hot-swapping module 530 then determines an event type associated with the hot-swapping event. Program module 532 manages the switch fabric card for the computing system based on the determined event type. Program module 532 also rearranges the internal switching of the computing system based on the hot-swapping event of the switch fabric card.

In some embodiments, hot-swapping module 530 precludes program module 532 from identifying the hot-swapping event based on an interrupt signal. It should be noted that the device view is updated based on identifying a respective device coupling control switch 570 via a corresponding control interface. If the event type indicates a presence of the switch fabric card, hot-swapping module 530 determines that the switch fabric card is ready for programming by identifying the hot-swapping event in the device view. Program module 532 then manages the switch fabric card by programming the switch fabric card to participate in the internal switching within switch 500.

On the other hand, if the event type indicates that the first switch fabric card is inaccessible, program module 532 manages the switch fabric card by disabling the switch fabric card and determining whether the switch fabric card becomes accessible within a predetermined number of attempts. If the first switch fabric card remains inaccessible within the predetermined number of attempts, program module 532 removes programming information associated with the switch fabric card from switch 500. However, if the switch fabric card becomes accessible within the predetermined number of attempts, program module 532 enables the first switch fabric card.

Note that the above-mentioned modules can be implemented in hardware as well as in software. In one embodiment, these modules can be embodied in computer-executable instructions stored in a memory, which is coupled to one or more processors in switch 500. When executed, these instructions cause the processor(s) to perform the aforementioned functions.

In summary, embodiments of the present invention provide a switching system and a method for facilitating efficient hot-swapping. In one embodiment, the switching system includes a plurality of line cards, each of which includes one or more ports, a processor, one or more switch fabric cards for facilitating switching among the line cards, and a memory storing instructions for facilitating efficient hot-swapping. During operation, the switching system identifies a hot-swapping event of a first switch fabric card based on a data structure indicating the one or more switch fabric cards. The hot-swapping event indicates insertion or removal of the first switch fabric card while the switching system remains in an operational state. The switching system then determines an event type associated with the hot-swapping event and manages the first switch fabric card based on the determined event type.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switching system, comprising:
   a processor;
   a plurality of line cards, wherein a respective line card includes one or more ports;
   one or more switch fabric cards configured to facilitate switching among the line cards; and
   a memory storing instructions that when executed by the processor cause the switching system to perform a method, the method comprising:
   identifying a hot-swapping event of a first switch fabric card based on a data structure indicating the one or more switch fabric cards, wherein the hot-swapping event indicates insertion or removal of the first switch fabric card while the switching system remains in an operational state;
   determining an event type associated with the hot-swapping event;
   managing the first switch fabric card based on the determined event type; and
   in response to the event type indicating the first switch fabric card being inaccessible, the managing the first switch fabric card further includes disabling the first switch fabric card, thereby ensuring that the first switch fabric card does not participate in an internal switching of the switching system, and determining whether the first switch fabric card becomes accessible within a predetermined number of attempts.

2. The switching system of claim 1, wherein, in response to the event type indicating a presence of the first switch fabric card, managing the first switch fabric card comprises programming the first switch fabric card to participate in the internal switching within the switching system.

3. The switching system of claim 1, wherein the method further comprises precluding the switching system from identifying the hot-swapping event based on an interrupt signal associated with the first switch fabric card.

4. The switching system of claim 1, wherein the first switch fabric card is a Peripheral Component Interconnect Express (PCIe) card pluggable to a PCIe interface of a PCIe control switch within the switching system.

5. The switching system of claim 4, wherein the method further comprises updating the data structure based on identifying a respective device coupling the PCIe interface of the PCIe control switch.

6. The switching system of claim 1, wherein the data structure is provided by an operating system of the switching system.

7. The switching system of claim 1, wherein, in response to determining that the first switch fabric card remains inaccessible within the predetermined number of attempts, the method further comprises removing programming information associated with the first switch fabric card from the switching system.

8. The switching system of claim 1, wherein, in response to determining that the first switch fabric card has become accessible within the predetermined number of attempts, the method further comprises enabling the first switch fabric card, thereby allowing the first switch fabric card to participate in the switching among the line cards.

9. The switching system of claim 1, wherein the method further comprises rearranging the switching among the line cards based on the hot-swapping event of the first switch fabric card.

10. A method for facilitating efficient hot-swapping in a switching system, wherein the switching system comprises:
   a plurality of line cards, wherein a respective line card includes one or more ports;
   one or more switch fabric cards configured to facilitate switching among the line cards; and
   wherein the method comprises:
   identifying a hot-swapping event of a first switch fabric card based on a data structure indicating the one or more switch fabric cards, wherein the hot-swapping event indicates insertion or removal of the first switch fabric card while the switching system remains in an operational state;
   determining an event type associated with the hot-swapping event;
   managing the first switch fabric card based on the determined event type; and
   in response to the event type indicating the first switch fabric card being inaccessible, the managing the first switch fabric card further includes disabling the first switch fabric card, thereby ensuring that the first switch fabric card does not participate in an internal switching of the switching system, and determining whether the first switch fabric card becomes accessible within a predetermined number of attempts.

11. The method of claim 10, wherein, in response to the event type indicating a presence of the first switch fabric card, managing the first switch fabric card comprises programming the first switch fabric card to participate in the internal switching within the switching system.

12. The method of claim 10, further comprising precluding the switching system from identifying the hot-swapping event based on an interrupt signal associated with the first switch fabric card.

13. The method of claim 10, wherein the first switch fabric card is a Peripheral Component Interconnect Express (PCIe) card pluggable to a PCIe interface of a PCIe control switch within the switching system.

14. The method of claim 13, further comprising updating the data structure based on identifying a respective device coupling the PCIe interface of the PCIe control switch.

15. The method of claim 10, wherein the data structure is provided by an operating system of the switching system.

16. The method of claim 10, wherein, in response to determining that the first switch fabric card remains inaccessible within the predetermined number of attempts, the method further comprises removing programming information associated with the first switch fabric card from the switch.

17. The method of claim 10, wherein, in response to determining that the first switch fabric card has become accessible within the predetermined number of attempts, the method further comprises enabling the first switch fabric card, thereby allowing the first switch fabric card to participate in the switching among the line cards.

18. The method of claim 10, further comprising rearranging the switching among the line cards based on the hot-swapping event of the first switch fabric card.

* * * * *